Oct. 24, 1933.  J. KLIEGL  1,932,277

ADVERTISING DEVICE

Filed Feb. 3, 1933

INVENTOR-
Joseph Kliegl
BY
Cooper, Kerr & Dunham
ATTORNEYS

Patented Oct. 24, 1933

1,932,277

UNITED STATES PATENT OFFICE 1,932,277

ADVERTISING DEVICE

Joseph Kliegl, New York, N. Y., assignor to John H. Kliegl, New York, N. Y.

Application February 3, 1933. Serial No. 654,983

6 Claims. (Cl. 40—34)

This invention is an improvement on the kind of advertising device disclosed in Patent 1,851,585, issued March 29, 1932, to John H. Kliegl, in which a slotted opaque disc and a color disc are rotatable relatively to each other to form an attractive color display that is partially interrupted at intervals in order to show advertising messages.

In the patent, the slotted opaque disc is of metal and is fast on the end of the motor shaft, being positively driven thereby. The color disc is behind the metal disc and is impositively driven by friction largely produced by a washer spring-pressed against the hub of the disc.

An object of the present invention is to disclose an improved impositive drive device which, under certain circumstances, has been found to be an improvement over the arrangement shown in the patent.

Further and other objects and advantages will be apparent from the specification and claims, and from the accompanying drawing which illustrates what is now considered the preferred embodiment of the invention.

Figure 1:
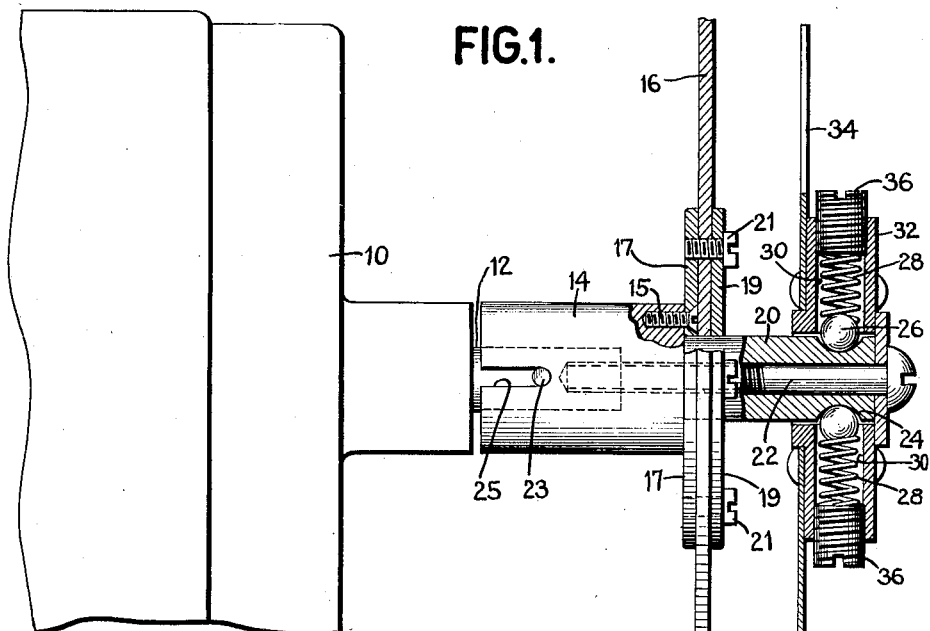
Fig. 1 shows the drive device in cross-section.
Figure 2:
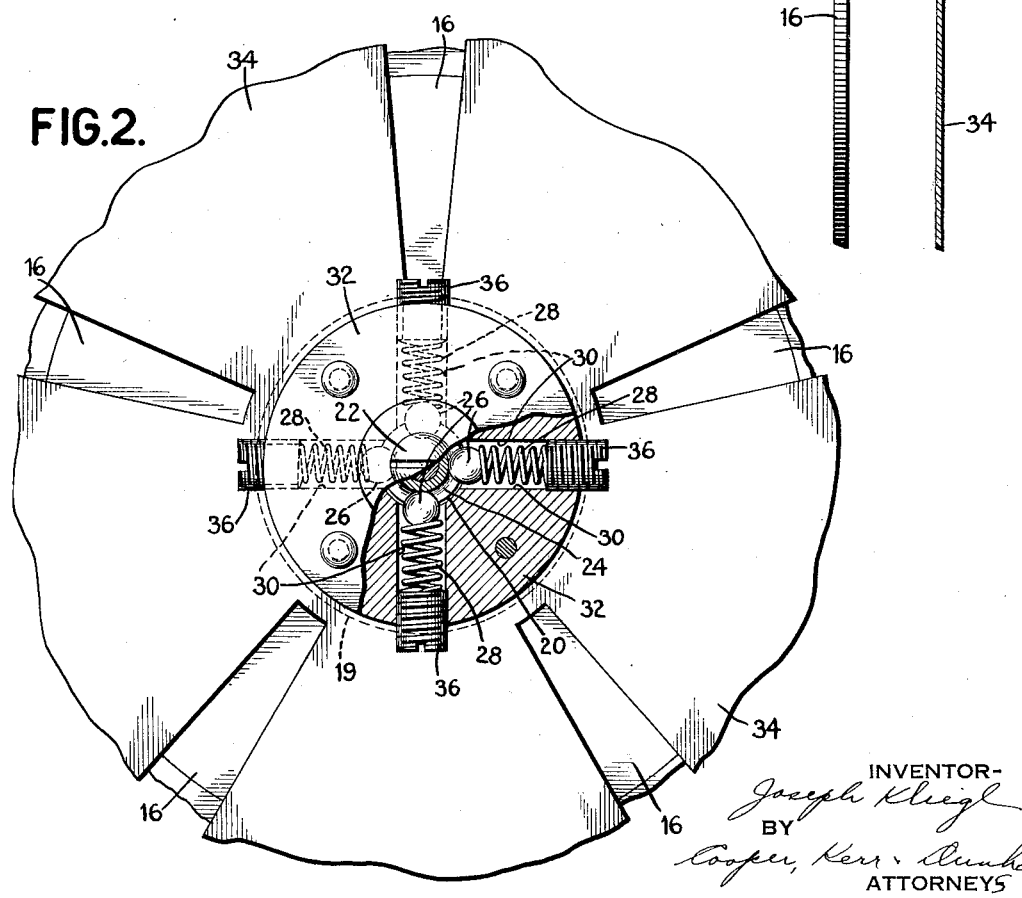
Fig. 2 is a view partly in section as seen by an observer at the right of Fig. 1.

In the drawing, motor 10 has a shaft 12 upon which is mounted a shaft extension having an enlarged portion 14 surrounding shaft 12, and a sleeve-like portion 20 of lesser diameter, the entire extension being held in place by bolt 22 passing through the bore of the extension and threaded into shaft 12.

Surrounding sleeve 20 and secured to hub 14 by screws 15, is a plate 17. Color disc 16 is held in position against plate 17 by plate 19, through which pass screws 21 threaded into plate 17. Pin 23, fast in shaft 12 and passing through slots 25 of hub 14, causes the shaft extension 14—20 and disc 16 to rotate at motor speed.

Sleeve 20 is provided with a circumferential groove 24 which serves as a race for balls 26, pressed against the shaft by springs 28. Each ball and its associated spring is mounted in a radial hole 30 in hub 32, to which is riveted the slotted opaque disc 34. Friction between balls and springs serves to retard rotation of the balls. The pressure of each spring on its ball is adjustable by a screw plug 36 threaded into the outer end of each hole 30.

With the arrangement above described, when the motor is running, disc 16 rotates at the same speed as the motor while disc 34 rotates at some other speed, being impositively driven by sleeve 20 through balls 26 in contact therewith. The balls partly roll and partly slide in race 24, the relative amounts of sliding and rolling being determined by the pressure of springs 28, as determined by the adjustment of plugs 36.

It is to be understood that the invention is not limited to the specific embodiment herein illustrated and described, but may be used in other ways without departure from its spirit as defined by the following claims.

1. In a device of the class described, in combination, a rotatable shaft, a member mounted on said shaft, and means for interconnecting said member and said shaft, said interconnecting means comprising balls bodily rotatable with said member, and means for pressing said balls resiliently against said shaft whereby said member is impositively rotated when said shaft is rotated.

2. In a device of the class described, in combination, a rotatable shaft, a member mounted on said shaft, and means for interconnecting said member and said shaft, said interconnecting means comprising balls bodily rotatable with said member, and friction means in contact with said balls for pressing said balls against said shaft whereby said member is impositively rotated when said shaft is rotated.

3. The invention set forth in claim 1 in which means is provided for adjusting said pressure on said balls.

4. The invention set forth in claim 2 in which means is provided for adjusting said pressure on said balls.

5. In a device of the class described, in combination, a rotatable shaft, a member mounted on said shaft and having radial holes therein, a ball in each of said holes, and a spring pressing each ball into contact with said shaft whereby said member is impositively rotated when said shaft is rotated.

6. The invention set forth in claim 5 in which screw plugs are threaded into said holes for adjusting the pressure of said springs on said balls.

JOSEPH KLIEGL.